US008402185B2

(12) United States Patent
Olson

(10) Patent No.: US 8,402,185 B2
(45) Date of Patent: *Mar. 19, 2013

(54) DISPLAY DEVICE ADAPTER WITH DIGITAL MEDIA INTERFACE

(75) Inventor: Jorell A. Olson, Portland, OR (US)

(73) Assignee: Seiko Epson Corporation, Tokyo (JP)

(*) Notice: Subject to any disclaimer, the term of this patent is extended or adjusted under 35 U.S.C. 154(b) by 1405 days.

This patent is subject to a terminal disclaimer.

(21) Appl. No.: 11/670,361

(22) Filed: Feb. 1, 2007

(65) Prior Publication Data
US 2007/0130402 A1 Jun. 7, 2007

Related U.S. Application Data

(63) Continuation-in-part of application No. 10/887,030, filed on Jul. 7, 2004, now abandoned, and a continuation-in-part of application No. 11/059,138, filed on Feb. 15, 2005, now Pat. No. 7,350,923, and a continuation-in-part of application No. 10/453,905, filed on Jun. 2, 2003, now Pat. No. 6,860,609, and a continuation-in-part of application No. 10/033,474, filed on Dec. 26, 2001, now Pat. No. 6,830,340.

(51) Int. Cl.
G06F 13/12 (2006.01)
G06F 13/38 (2006.01)

(52) U.S. Cl. ............... 710/62; 710/72; 710/73; 710/74

(58) Field of Classification Search .............. None
See application file for complete search history.

(56) References Cited

U.S. PATENT DOCUMENTS

| 4,739,396 A | 4/1988 | Hyatt |
| 5,847,748 A | 12/1998 | Laughlin |
| 6,137,794 A | 10/2000 | Brown |
| 6,219,793 B1 | 4/2001 | Li et al. |
| 6,388,654 B1 | 5/2002 | Platzker et al. |
| 6,437,786 B1 | 8/2002 | Yasukawa |
| 6,438,638 B1 | 8/2002 | Jones et al. |
| 6,489,934 B1 | 12/2002 | Klausner |
| 6,489,943 B1 | 12/2002 | Yeo |
| 6,509,910 B1 | 1/2003 | Agarwal et al. |
| 6,522,352 B1 | 2/2003 | Strandwitz et al. |
| 6,561,421 B1 | 5/2003 | Yu |
| 6,626,543 B2 | 9/2003 | Derryberry |
| 6,637,895 B2 | 10/2003 | Fujimori et al. |
| 6,735,616 B1 | 5/2004 | Thompson et al. |
| 6,812,954 B1 | 11/2004 | Priestman et al. |
| 6,830,340 B2 | 12/2004 | Olson et al. |
| 6,839,560 B1 | 1/2005 | Bahl et al. |
| 6,860,609 B2 | 3/2005 | Olson et al. |
| 6,961,514 B1 | 11/2005 | Neuman et al. |
| 6,977,693 B2 | 12/2005 | Aronovitz |
| 7,059,722 B2 | 6/2006 | Matoba et al. |
| 7,061,449 B2 | 6/2006 | Oya et al. |

(Continued)

FOREIGN PATENT DOCUMENTS

DE  202 00 099 U1  1/2002
EP  1 260 931 A1  11/2002

(Continued)

OTHER PUBLICATIONS

"Forward"; Mind Path Technologies Inc.; May 1, 1998; Mind Path Technologies Inc.; pp. iii-38.*

(Continued)

Primary Examiner — Idriss N Alrobaye
Assistant Examiner — Ronald Modo
(74) Attorney, Agent, or Firm — Oliff & Berridge, PLC

(57) ABSTRACT

An apparatus comprises a plug to couple the apparatus to a display device, a first receptacle to receive a first media device containing image data for display on the display device and an imaging processor coupled to the plug and the first receptacle.

18 Claims, 5 Drawing Sheets

U.S. PATENT DOCUMENTS

| | | | |
|---|---|---|---|
| 7,118,232 B2 | 10/2006 | Matoba et al. | |
| 7,150,534 B2 | 12/2006 | Matoba et al. | |
| 7,628,623 B2 * | 12/2009 | Combs et al. | 439/135 |
| 2001/0003479 A1 | 6/2001 | Fujiwara | |
| 2001/0026371 A1 | 10/2001 | Nozaki | |
| 2001/0033404 A1 | 10/2001 | Escobosa et al. | |
| 2001/0034579 A1 | 10/2001 | Howard et al. | |
| 2002/0012433 A1 | 1/2002 | Haverinen et al. | |
| 2002/0065044 A1 | 5/2002 | Ito | |
| 2002/0131078 A1 | 9/2002 | Tsukinokizawa | |
| 2002/0178307 A1 * | 11/2002 | Pua et al. | 710/62 |
| 2002/0196378 A1 | 12/2002 | Slobodin et al. | |
| 2003/0017846 A1 | 1/2003 | Estevez et al. | |
| 2003/0053033 A1 | 3/2003 | Vrachan et al. | |
| 2003/0117587 A1 * | 6/2003 | Olson et al. | 353/30 |
| 2003/0158932 A1 | 8/2003 | Machida et al. | |
| 2003/0214670 A1 | 11/2003 | Ohmura | |
| 2003/0218597 A1 | 11/2003 | Hodzic et al. | |
| 2003/0227554 A1 | 12/2003 | Kazami et al. | |
| 2004/0041989 A1 | 3/2004 | Olson et al. | |
| 2004/0088440 A1 * | 5/2004 | Chen et al. | 710/1 |
| 2004/0090651 A1 | 5/2004 | Kang et al. | |
| 2004/0091232 A1 | 5/2004 | Appling, III | |
| 2005/0097263 A1 * | 5/2005 | Wurzburg | 711/103 |
| 2010/0332569 A1 * | 12/2010 | Bryant-Rich et al. | 707/912 |

FOREIGN PATENT DOCUMENTS

| | | | |
|---|---|---|---|
| JP | 2000-023148 A | 1/2000 | |
| JP | 2000-115442 A | 4/2000 | |
| JP | 2000-222163 A | 8/2000 | |
| JP | A-2002-244630 | 8/2002 | |
| JP | 2002-278529 A | 9/2002 | |
| JP | A-2002-287242 | 10/2002 | |
| JP | 2002-359887 A | 12/2002 | |
| WO | 01/78371 A | 10/2001 | |
| WO | WO 01/96940 A1 | 12/2001 | |
| WO | WO 02/01545 A | 1/2002 | |
| WO | WO 02/102054 A | 12/2002 | |
| WO | WO 02/102054 A1 | 12/2002 | |
| WO | 03/103286 A | 12/2003 | |

OTHER PUBLICATIONS

"Forward"; Mind Path Technologies, Inc.; May 1, 1998; Mind Path Technologies, Inc,; pp. iii-38.

Harris, et al., "Latest VESA Standard Gives Facelift to Plug-and-Display Solution" Electronic Cesign, Penton Media, Cleveland, Ohio, US, Vopl. 46, No. 19, Aug. 17, 1998.

Pettelkau, Jeff; "Toshiba TDP-SW20 DLP Projector." Oct. 2004 [retrieved on Mar. 15, 2007] Retrieved from the Internet: <URL: http://www.jiwire.com/toshiba-TDP-SW20-wireless-projector-photo-image-gallery.htm>.

Merriam-Webster's Collegiate Dictionary, Tenth Edition,.copyright 2001, p. 893.

"Checking it out on Office 2000 new functions"; *Guide for Office 2000 that helps you understand its functions*; May 1, 1999, pp. 118-125, Nikkei BP Soft Press.

* cited by examiner

DISPLAY DEVICE ADAPTER WITH DIGITAL MEDIA INTERFACE

RELATED APPLICATIONS

This application claims priority to U.S. patent application Ser. No. 10/887,030, filed Jul. 7, 2004, and to U.S. patent application Ser. No. 11/059,138, filed Feb. 15, 2005. U.S. patent application Ser. No. 11/059,138 is a continuation of U.S. patent application Ser. No. 10/453,905, filed Jun. 2, 2003, which is a continuation-in-part of U.S. patent application Ser. No. 10/033,474, filed Dec. 26, 2001. The specifications of said applications are hereby incorporated in their entirety, except for those sections, if any, that are inconsistent with this specification.

FIELD OF THE INVENTION

The present invention relates to the field of electronic display devices, and, in particular, interfacing devices to electronic display devices.

BACKGROUND OF INVENTION

Digital cameras typically operate by storing image information corresponding to photographs taken on media devices for subsequent viewing. Various media devices have been designed for use in the storage of image information in digital cameras. Memory Stick, utilized primarily by Sony Corporation for the storage of image information, is one such media device. SmartMedia™ is Toshiba Corporation's trademarked name for a media device that stores image information and complies with the Solid State Floppy Disk Card (SSFDC) format. Other media such as CompactFlash™ and Secured Digital (SD) Card have been developed. Each media device design has different mechanical and/or electrical characteristics.

As with the variety of different media devices designs utilized for the storage of image information, the image information itself may be stored in a variety of different formats on these media devices. The different formats for still image information are voluminous and include TIFF (Tagged Image File Format), GIF (Graphics Interchange Format) and JPEG (Joint Photographic Experts Group). While any of these formats may be utilized to store still pictures, most digital cameras store the image information in the JPEG format. For moving pictures storage various possibilities for the format of stored information. These formats include AVI (Audio Video Interleave) and MPEG (Moving Picture Experts Group).

BRIEF DESCRIPTION OF DRAWINGS

Embodiments of the present invention will be described referencing the accompanying drawings in which like references denote similar elements, and in which.

DETAILED DESCRIPTION OF THE EMBODIMENTS

In the following detailed description, a novel apparatus for displaying stored image information on a display device is disclosed. In this description, mention is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The phrase display device, as used herein, is meant to include a device capable of displaying images. Thus, the phrase display device is meant to include, but is not limited to projectors, liquid crystal displays, cathode ray tube displays, and plasma displays.

The phrase media devices, as used herein, is meant to include a device capable of storing still images or motion images on a media. Thus, the phrase media device is meant to include, but is not limited to, flash memory devices such as Memory Stick, Memory Stick Pro, Solid State Floppy Disk Card (SSFDC), Multi Media Card (MMC), Secured Digital (SD™ Card), CompactFlash™, xD-Picture Card™, and Universal Serial Bus (USB) compact flash memory. In addition, while the discussions below focuses on the processing of still image photographs, the disclosure should not be so limited. The devices which store the image data on the image devices may store motion images in addition to still images.

As mentioned, still image or motion image information may be stored on media devices by image capturing devices, e.g. digital cameras. The image information stored on image devices can transferred to other devices in a number of ways. The information may be transferred directly to another device by connecting a cable between the image capturing device and the other device. A common method of such transfer with a cable is via a Universal Serial Bus (USB) cable. The information may also be transferred wirelessly via infrared (IR) or radio frequency (RF). In addition, the information may be transferred to another device by removing the image device from the image capturing device and placing it in an appropriate receptacle on the other device.

Figure 1:
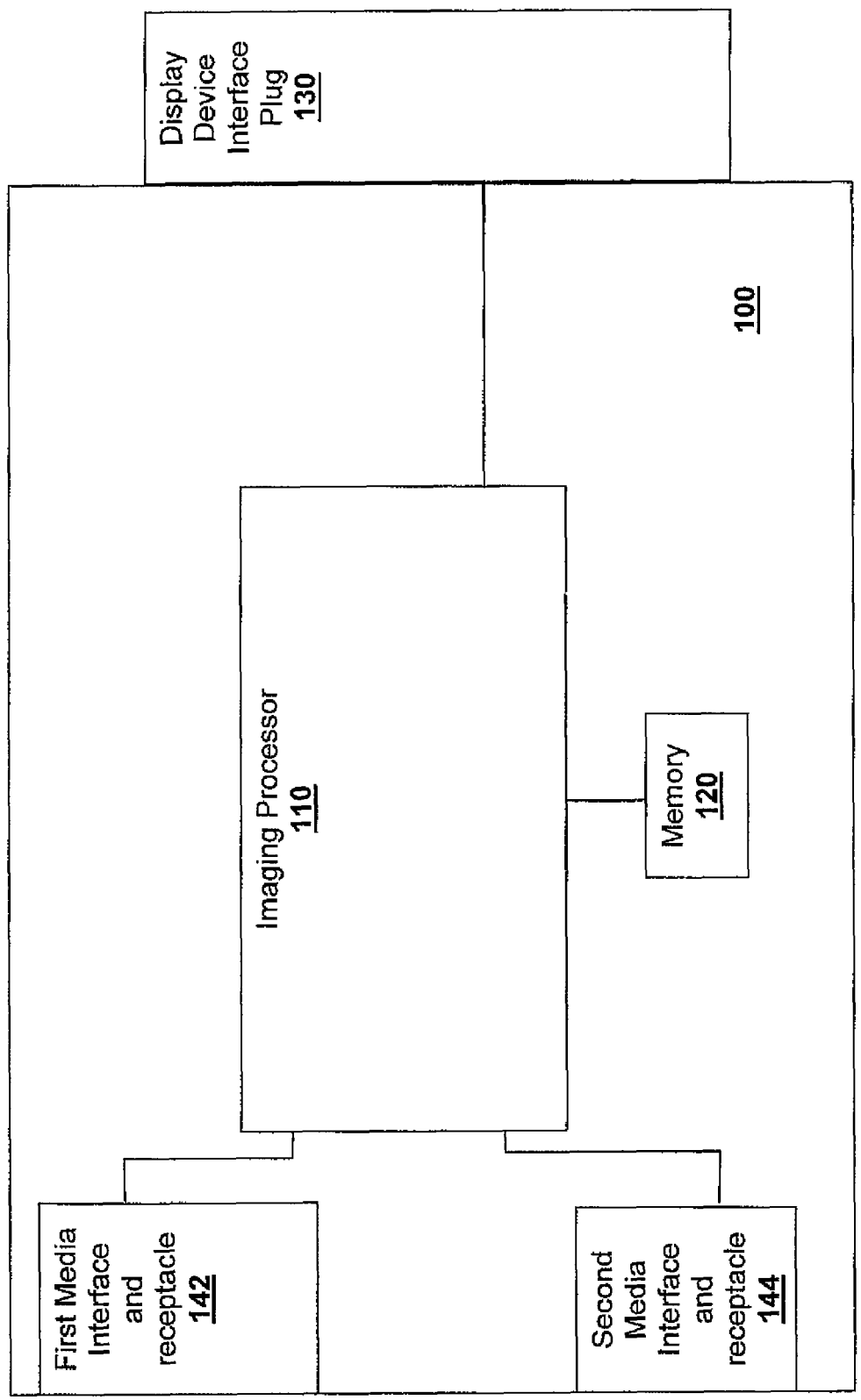
FIG. 1 illustrates a block diagram for an adapter with a first and a second media interface, in accordance with one embodiment.

FIG. 1 illustrates a block diagram for an adapter 100 for use with a display device, in accordance with one embodiment. The adapter 100 may accept a media device as input at a first 142 and second 144 media interface/receptacles, and, as output, provide display information via a plug 130. The plug 130 may allow the adapter 100 to be plugged into a display device (not illustrated) having compatible receptacle. For example, the plug 130 may be an M1-D or M1-A plug compliant with the Video Electronics Standards Association (VESA) M1 Display Interface System Standard. The plug 130 would allow the adapter 100 to interface with a display adapter containing an M1-D, M1-A or M1-DA compatible receptacle. The first 142 and second 144 media interface/receptacles are for receiving media devices. The first 142 and second 144 media interface/receptacles may be two receptacles to receive media devices of the same type or different type.

Upon insertion of a media device in an appropriate media receptacle, an imaging processor 110 may operate in various ways depending on its configuration. In one embodiment, upon insertion of the media device into the adapter 100, an image processor 110 detects the media type and may begin the download of a first stored image. In one embodiment, the downloaded image may be stored locally in memory 120. In another embodiment, the downloaded image is processed and sent to the display device interface plug 130 for display by the display device.

Figure 2:
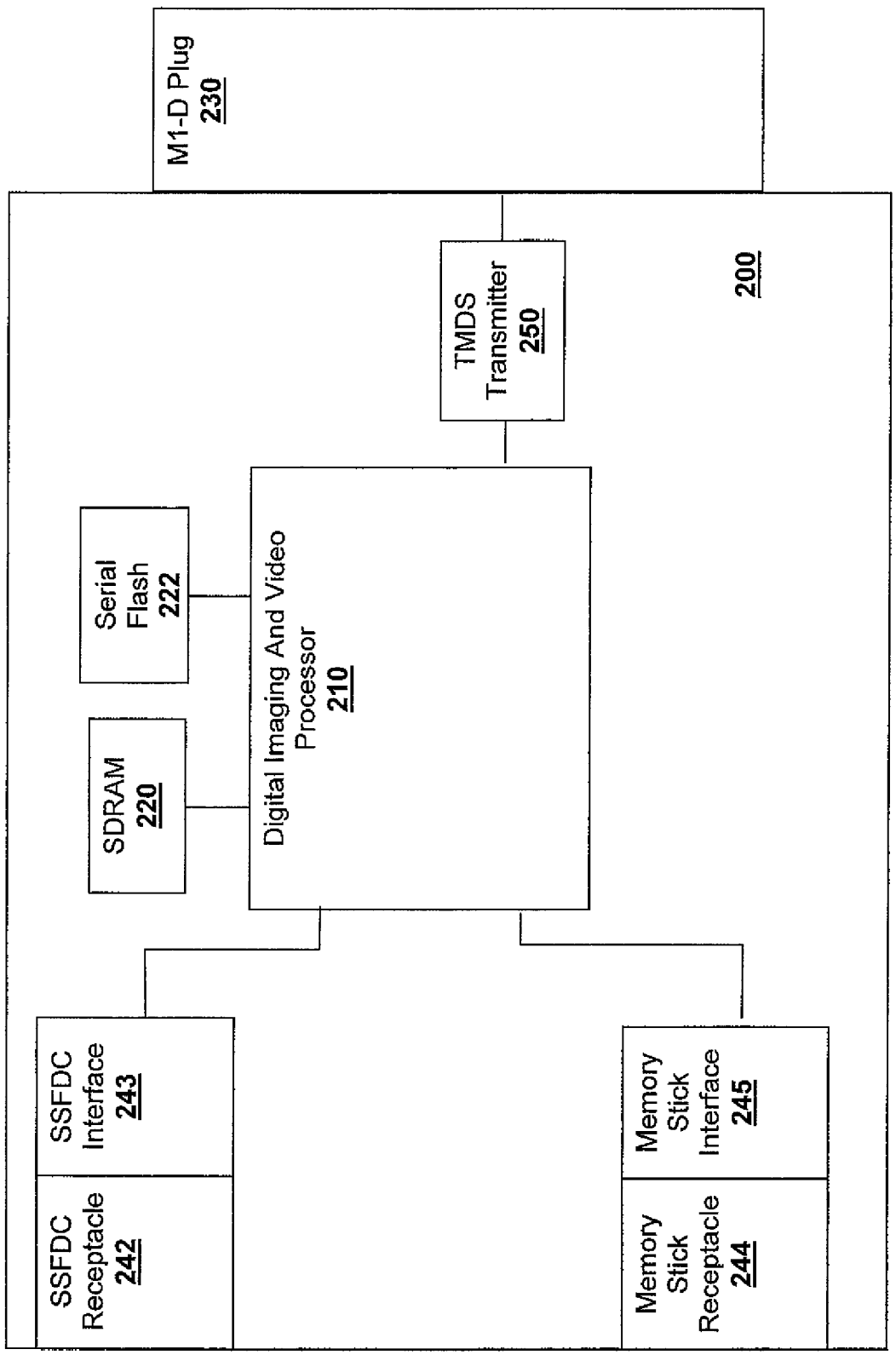
FIG. 2 illustrates a block diagram for an adapter with a digital media interface in accordance with another embodiment.

FIG. 2 illustrates a block diagram for an adapter 200 with media interfaces 243, 245 and receptacles 242, 244 in accordance with another embodiment. In this embodiment, a digital imaging and video processor 210 is utilized in the adapter 200. Coupled to the digital imaging and video processor 210 is synchronous dynamic random access memory (SDRAM) 220 that is utilized by the digital imaging and video processor 210 to, among other things, process image data received from media devices. Serial Flash device 222 is utilized to store, among other things, operating instructions for the digital imaging and video processor 210. When the adapter is supplied with power, the digital imaging and video processor 210 copies the operating instructions to the SDRAM 220. The digital imaging and video processor 210 is further coupled to a Transition Minimized Differential Signal (TMDS) transmitter 250. The digital imaging and video processor 210 reads image information from a media device. This image information may be in the form of for example, a JPEG file. The digital imaging and video processor 210 can convert the image information from the JPEG format to 24-bit Red-Green-Blue (RGB) data which is then provided to the TMDS transmitter 250. In the embodiment illustrated, the TMDS transmitter 250 is coupled to an M1-D compatible plug 230. The TMDS transmitter 250 converts the RGB data to transmission minimized differential signals for transmission through the M1-D compatible plug 230.

In the embodiment illustrated, a Solid State Floppy Disk Card (SSFDC) interface 243 and receptacle 242 exist to provide the ability to interface with very small and lightweight flash memories, SSFDCs. In such an embodiment a SSFDC receptacle 242 in the adapter is designed to fit the profile of an SSFDC. The SSFDC receptacle 242 is designed to allow for the electrical interface of the SSFDC interface 243 to connect with an SSFDC, for example a SmartMedia™ device from Toshiba Corporation, when the SSFDC is positioned in the SSFDC receptacle 242. In this embodiment, in addition to the SSFDC interface 243 and receptacle 242 a Memory Stick interface 245 and receptacle 244 is part of the adapter. The receptacle is designed to fit the profile of a memory stick media device such that the electrical interface of the Memory Stick interface 243 to connect with a Memory Stick device when the Memory Stick device is positioned in the Memory Stick receptacle 244. In various other embodiments any number of interfaces to various media devices is supported. For example, in one embodiment, a single interface to Compact-Flash device is present.

Figure 3:
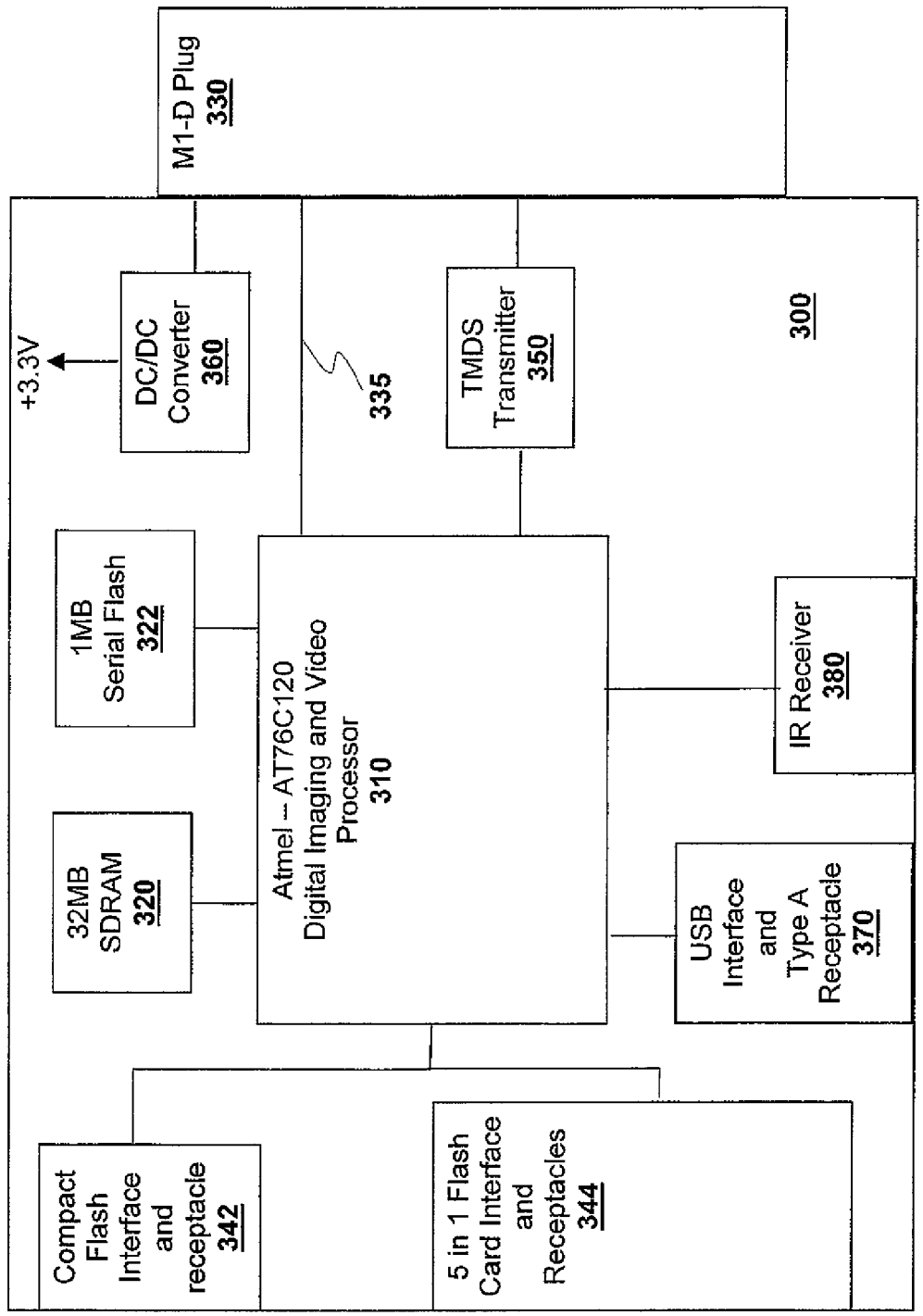
FIG. 3 illustrates a block diagram for an adapter with a digital media interface in accordance with yet another embodiment.

FIG. 3 illustrates a block diagram for an adapter 300 with media device interfaces in accordance with yet another embodiment. In the embodiment illustrated an Atmel AT76C120 high performance digital imaging and video processor 310 is utilized in the adapter 300 to process image data. While in the embodiment shown an Atmel Imaging Processor is illustrated, other image processors from the same vendor or additional vendors such as Chipwright, Cirrus, Texas Instruments and Phillips may be utilized. The imaging processor 310 is coupled to a 1 megabyte serial flash device 322 and 32 megabytes of SDRAM 320. The serial flash device may contain operational instructions that may be download to the SDRAM 320 by video processor 310 the when the adapter 300 is powered on. The imaging processor 310 then executes the operational instructions from the SDRAM 320.

The imaging processor 310 is coupled to several media interfaces. For example, the imaging processor 310 is coupled to a multiple device interface and corresponding receptacles. The multiple device interface comprises a 5 in 1 flash card interface is capable of communicating with five different flash memory devices. The five include MMC, Memory Stick, SSFDC, Secured Digital (SO) Card, and xD-Picture Card. The 5 in 1 flash card interface is coupled to appropriate receptacles for handing the various form factors of these different flash memory devices. In addition to being coupled to the 5 in 1 interface, the imaging processor 310 is coupled to a CompactFlash interface 342. The CompactFlash interface 342 and 5 in 1 interface 344 are arranged such that, when a media device is inserted in an appropriate receptacle the media device is in electrical contact with the corresponding interface. In addition, in the embodiment illustrated, the Compact Flash interface 342 and the 5 in 1 interface share pins of the interface to the imaging processor 310. In other embodiments, different media interfaces have separate connectivity to the imaging processor 310 resulting in no sharing of pins. The imaging processor 310 is additionally coupled to a Universal Serial Bus interface including a type A receptacle 370. This may allow, for example, the ability for users to plug USB flash memory devices into the adapter 300.

The imaging processor 310 is further coupled to a Transition Minimized Differential Signal (TMDS) transmitter 350. The imaging processor 310 reads image information from a media device. This image information may be in the form of, for example, a JPEG file. The imaging processor 310 converts the image information from the JPEG format to 24-bit Red-Green-Blue (RGB) data which is then provided to the TMDS transmitter 350. In the embodiment illustrated, the TMDS transmitter 350 is coupled to an M1-D compatible plug 330. The TMDS transmitter converts the RGB data to transmission minimized differential signals for transmission through the M1-D compatible plug 330. In the embodiment illustrated, the imaging processor 310 generates a display data channel (DDC) directly and this signal 335 is also provided to the M1-D compatible plug 330.

The adapter 300 may be powered in a number of ways. The power source may be external and supplied to the adapter via a power cable. However, in certain embodiments, when the adapter is coupled to the display device through a plug 330, the adapter 300 may obtain power through one or more pins of the plug 330. For example, if the plug 330 is an M1 plug, a display device may provide a +5V power supply to the adapter through the hot plug detect pin of the M1 plug when the adapter is coupled to the display device through an M1 receptacle. In the embodiment illustrated in FIG. 3, the +5V power supply may be provided to a DC/DC converter 360. The output of the DC/DC converter 360 may provide power supply signals at an appropriate voltage level for the system. For example, assuming the electronic devices (processor, memory, etc.) in the adapter 300 operate with a 3.3V supply voltage, the DC/DC converter may supply 3.3V at the outputs of the DC/DC converter 360 for use by these electronic device.

In the embodiment illustrated in FIG. 3, an infrared (IR) receiver 380 may be utilized to receive signals from an IR transmitter (not shown). The IR transmitter may be part of a user device that may be utilized to perform a number of different tasks related to the manipulation of the display of, for example, photographs stored on a media device. For example, a first transmitted signal from the IR transmitter to the IR receiver 380 on the adapter 300 may be utilized to initiate a slide show mode for photographs on a media device provided to the adapter 300. Upon initialization of a slide show mode, additional transmitted signals received by the IR receiver 380 can be used to advance to a next photograph or move backwards to a previously viewed photograph.

Figure 4:
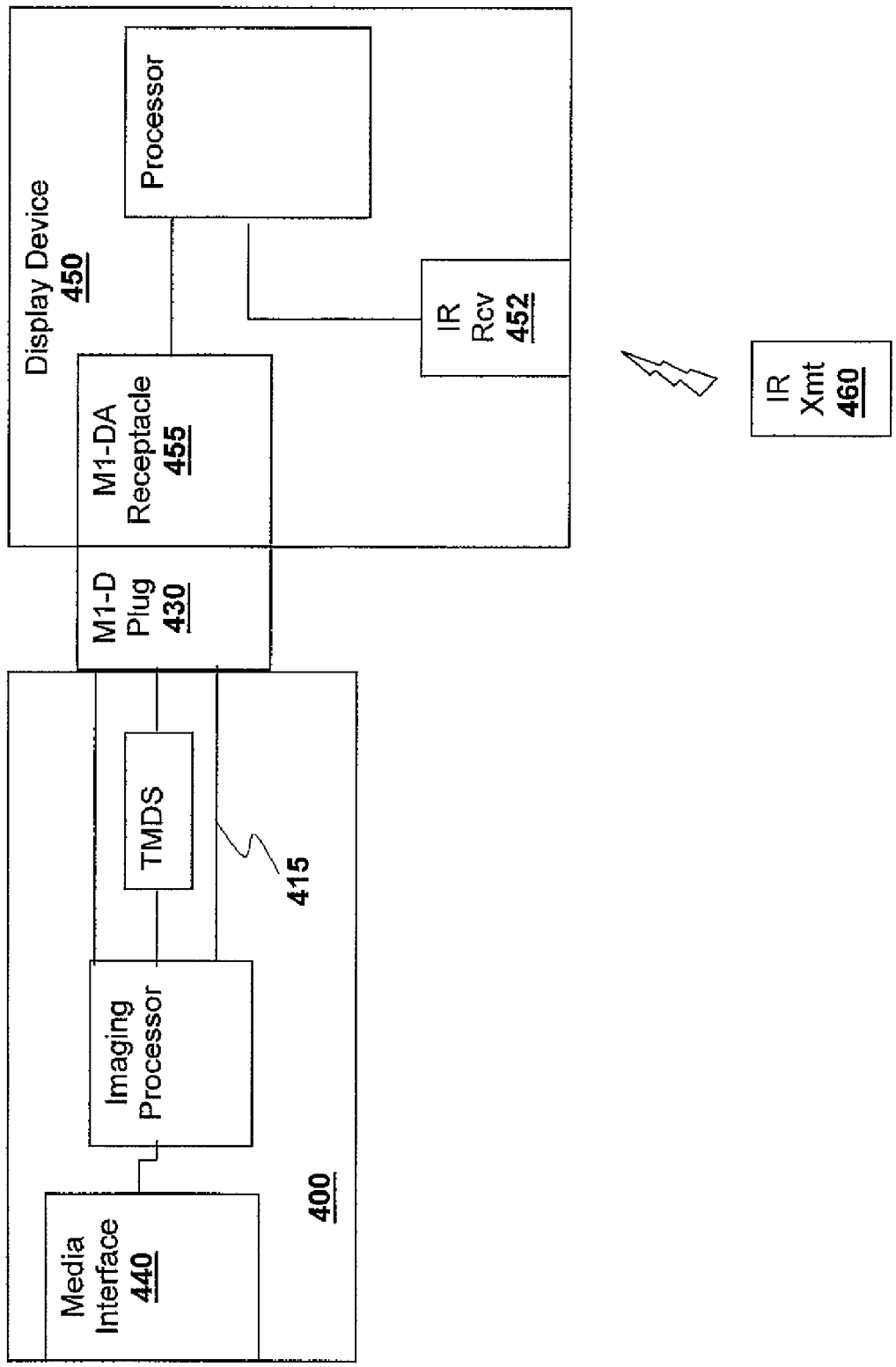
FIG. 4 illustrates an adapter and display device having an IR receiver, in accordance with one embodiment.

FIG. 4 illustrates an adapter 400 and display device 450 having an IR receiver 452, in accordance with one embodiment. Instead of utilizing an IR transmitter 460 for sending signals to an IR receiver on the adapter, as discussed above, an IR transmitter may transmit signals to an IR receiver 452 in a display device 450. In this embodiment, the display device 450 may be modified to support the receipt of commands for use by the adapter 400. The adapter 400 and display device 450 comprise an M1-D plug 430 and receptacle 455, respectively. Through the M1-D interface there is USB connectivity. The display device 450 can be programmed to recognize the adapter 400 by looking at the Hsync and Vsync signals when the adapter is plugged into the display device 450. The adapter 400 can download information to the display device 450 regarding configuration information. When the display device 450 has detected an adapter 400 plugged into its M1-D receptacle 455 and received configuration information, the display device 450 may switch to a mode where it interprets certain received IR signals as instructions to be passed to the adapter 400. These commands may then be transmitted from the display device 450 to the adapter 400 via USB link 415. These commands may be related to the display of material present on a media device accessed through media interface 440. IR transmitters and IR receivers have been utilized for transmitting control signals to display devices. Thus, their operation is well-known and will not be described further.

Figure 5:
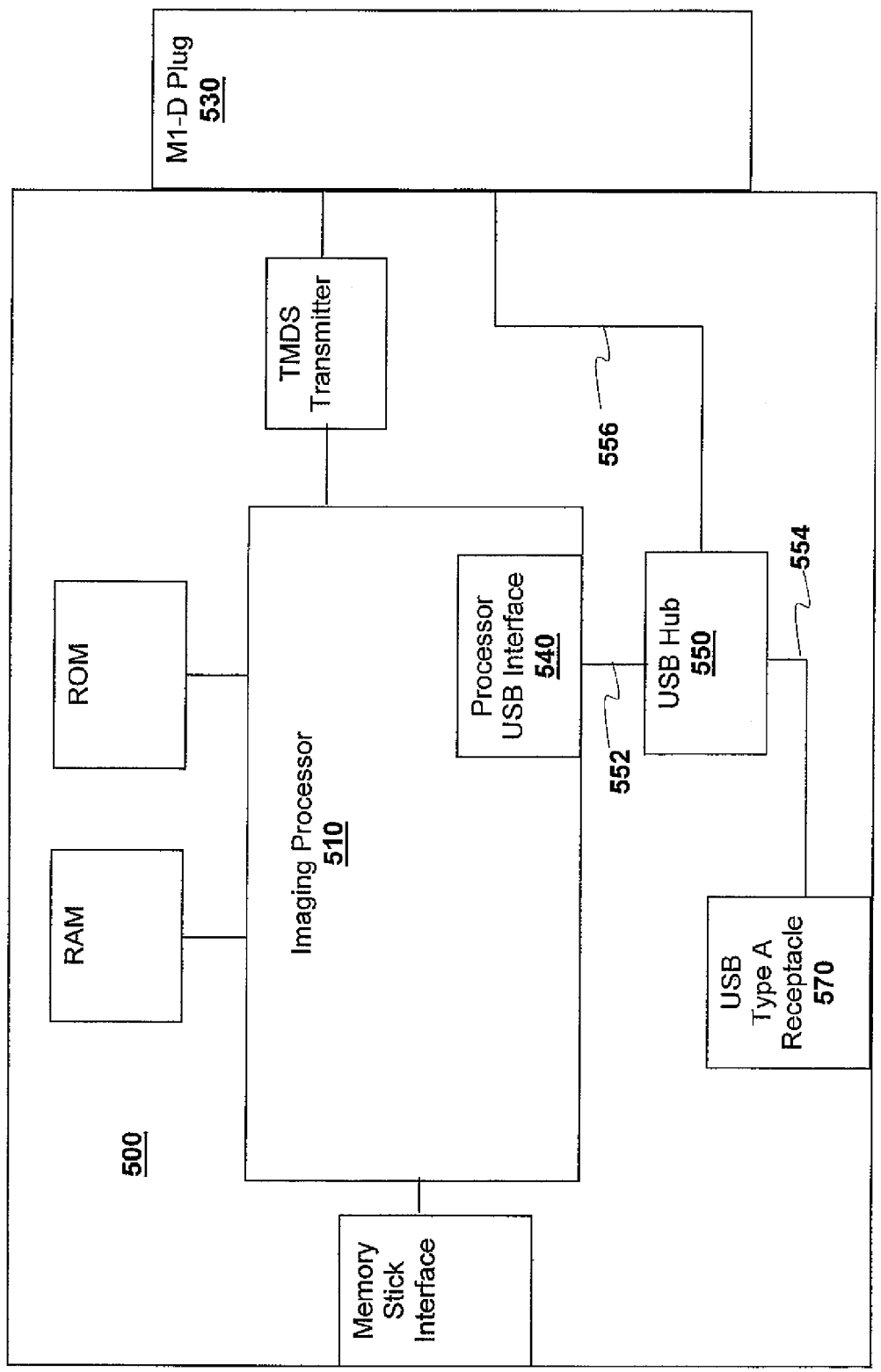
FIG. 5 illustrates an adapter with USB interface capability to a both display device and a USB receptacle, in accordance with one embodiment.

FIG. 5 illustrates an adapter 500 with USB interface capability with a both display device and a USB receptacle, in accordance with one embodiment. An imaging processor 510 may contain a USB interface 540 to provide for serial communication with the imaging processor 510. In the case where there is only a single USB interface to the imaging processor, to provide support for both USB information 556 from a display device and, for example, image data 552, 554 from a USB device coupled to a USB Type A receptacle 570, a USB hub 550 is utilized. The USB hub 550 may then provide switching function between the two information sources in order to provide the data to the single USB interface 540 of the imaging processor 510.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a plug to couple the apparatus to a projector;
   a first receptacle to receive a first media device containing image data for display on the projector;
   a second receptacle to receive a second media device containing image data for display on the projector; and
   an imaging processor coupled to the plug and the first and second receptacles, configured to automatically transfer at least some of the image data to the projector.

2. The apparatus of claim 1 further comprising an interface, which is separate and distinct from the first receptacle, to a control mechanism to control the image data provided to the plug.

3. The apparatus of claim 2 wherein the interface comprises an infrared receiver.

4. The apparatus of claim 2 wherein the plug is an M1-D plug and the interface comprises Universal Serial Bus (USB) communications through the plug.

5. The apparatus of claim 4 further comprising a Universal Serial Bus hub coupled between the imaging processor and the plug and further coupled between the imaging processor and the first receptacle and wherein the first receptacle is a receptacle to receive a Universal Serial Bus flash memory device.

6. The apparatus of claim 1 further comprising a direct current to direct current converter.

7. The apparatus of claim 1 further comprising an interface coupled between the first receptacle and the imaging processor wherein the interface comprises a multiple device interface.

8. The apparatus of claim 7 wherein the multiple device interface comprises a 5 in 1 interface.

9. The apparatus of claim 1 wherein the imaging processor comprises a digital camera processor.

10. The apparatus of claim 1 wherein the plug is a plug selected from the group consisting of M1-D and M1-A.

11. The apparatus of claim 1 wherein the projector comprises a digital projector.

12. An apparatus comprising:
   an M1-D plug to couple the apparatus to a projector;
   a first receptacle to receive a first media device containing image data for display on the projector;
   a second receptacle to receive a second media device containing image data for display on the projector;
   an imaging processor coupled to the plug and the first and second receptacles, configured to automatically transfer at least some of the image data to the projector;
   a transition minimized differential signaling (TMDS) transmitter coupled between the M1-D plug and the imaging processor; and
   a universal serial bus (USB) interface including a Type A receptacle coupled to the imaging processor.

13. The apparatus of claim 12 further comprising an interface to a control mechanism to control the image data provided to the plug.

14. The apparatus of claim 13 wherein the interface comprises Universal Serial Bus (USB) communications through the M1 plug.

15. The apparatus of claim 13 further comprising an infrared receiver.

16. The apparatus of claim 12 further comprising an interface coupled between the first receptacle and the imaging processor wherein the interface comprises a multiple device interface.

17. The apparatus of claim 16 wherein the multiple device interface comprises a 5 in 1 interface.

18. The apparatus of claim 12 wherein the projector comprises a digital projector.

* * * * *